US009226528B2

(12) United States Patent
Sedivy (10) Patent No.: US 9,226,528 B2
(45) Date of Patent: Jan. 5, 2016

(54) WEARABLE BLANKET-LIKE ARTICLE FOR PROVIDING WARMTH AND COMFORT

(71) Applicant: Irena Sedivy, Southport, NC (US)

(72) Inventor: Irena Sedivy, Southport, NC (US)

( * ) Notice: Subject to any disclaimer, the term of this patent is extended or adjusted under 35 U.S.C. 154(b) by 0 days.

(21) Appl. No.: 14/247,896

(22) Filed: Apr. 8, 2014

(65) Prior Publication Data

US 2014/0298587 A1    Oct. 9, 2014

Related U.S. Application Data

(60) Provisional application No. 61/809,461, filed on Apr. 8, 2013.

(51) Int. Cl.
| | | |
|---|---|---|
| *A41B 13/06* | (2006.01) | |
| *A47G 9/02* | (2006.01) | |
| *A41D 11/00* | (2006.01) | |
| *A41D 13/12* | (2006.01) | |
| *A47G 9/06* | (2006.01) | |
| *A47G 9/08* | (2006.01) | |
| *B60N 2/28* | (2006.01) | |

(52) U.S. Cl.
CPC ............... *A41B 13/06* (2013.01); *A41D 11/00* (2013.01); *A41D 13/1272* (2013.01); *A47G 9/0223* (2013.01); *A47G 9/068* (2013.01); *A47G 9/083* (2013.01); *B60N 2/2881* (2013.01)

(58) Field of Classification Search
CPC ...... A41B 13/00; A41B 13/06; A41B 13/065; A41D 11/00; A41D 13/1272; A47G 9/02; A47G 9/0207; A47G 9/0223; A47G 9/083; A47G 9/08; A47G 9/068; B60N 2/2881; Y10T 29/49947
See application file for complete search history.

(56) References Cited

U.S. PATENT DOCUMENTS

| | | | | |
|---|---|---|---|---|
| 3,962,738 A * | 6/1976 | Menditto | ........................... | 5/494 |
| 4,823,405 A * | 4/1989 | Porter | ................... | 2/80 |
| 5,046,204 A * | 9/1991 | Mohler | ......................... | 5/413 R |
| 5,058,226 A * | 10/1991 | Crosby | ............................ | 5/494 |
| 5,611,095 A * | 3/1997 | Schneider | ........................ | 5/482 |
| 5,897,164 A * | 4/1999 | Kagan et al. | ............. | 297/219.12 |
| 5,950,261 A * | 9/1999 | Hay et al. | ........................... | 5/482 |
| 6,145,932 A * | 11/2000 | Hamel-Nyhus et al. | ...... | 297/465 |
| 6,401,248 B1 * | 6/2002 | Christensen | ......................... | 2/69 |
| 6,408,439 B1 * | 6/2002 | Garforth-Crippen | ............... | 2/80 |
| 6,757,922 B2 * | 7/2004 | Chancey | ........................... | 5/482 |
| 6,817,663 B1 * | 11/2004 | Stuart | ...................... | 297/219.12 |
| 8,650,663 B2 * | 2/2014 | Fair et al. | ......................... | 2/69.5 |
| 2008/0250560 A1 * | 10/2008 | Armstrong | ........................ | 5/485 |
| 2010/0257653 A1 * | 10/2010 | Pitts | .................................. | 2/69.5 |
| 2011/0204687 A1 * | 8/2011 | Bishop | ..................... | 297/219.12 |
| 2012/0047621 A1 * | 3/2012 | Bocchino | .......................... | 2/69.5 |
| 2012/0102645 A1 * | 5/2012 | Schneider | ......................... | 5/494 |
| 2012/0125347 A1 * | 5/2012 | Soileau | ........................ | 128/873 |
| 2012/0311762 A1 * | 12/2012 | Aiken et al. | ..................... | 2/69.5 |
| 2014/0020177 A1 * | 1/2014 | Coates | ............................. | 5/494 |

\* cited by examiner

*Primary Examiner* — Nicholas Polito
*Assistant Examiner* — David R Hare
(74) *Attorney, Agent, or Firm* — Carla Gannon Law (57) ABSTRACT

A fabric article includes a variety of structural features for swaddling a person, providing warmth to the head, supporting the neck, permitting the use of restraining belts, and/or allowing independent leg movement. The article includes opposing protrusions for wrapping around the torso of a body and securing the arms within. The lower portion of the article preferably defines a slit with overlapping flaps, which are easily configured into legs. The slit allows a restraining belt to fit snugly between the legs of a wearer, such that a person can be swaddled while still being properly secured by restraining belts.

18 Claims, 7 Drawing Sheets

WEARABLE BLANKET-LIKE ARTICLE FOR PROVIDING WARMTH AND COMFORT

CROSS-REFERENCE TO RELATED APPLICATIONS

This application claims the benefit of U.S. Provisional Application 61/809,461, which was filed on Apr. 8, 2013.

BACKGROUND OF THE INVENTION

The present invention relates to fabric articles for providing warmth and comfort, and more specifically to a fabric article including a variety of features for swaddling a person, providing warmth to the head, supporting the neck, permitting the use of restraining belts, and/or allowing independent leg movement.

Newborn babies are typically swaddled for warmth and comfort. This is accomplished by wrapping the baby in a blanket in a manner such that the head is exposed, but the rest of the body is snugly enclosed in fabric. This conventional method of wrapping a newborn, which typically uses a small blanket, has shortcomings. One issue is that a newborn's neck muscles are not developed, and new parents and others holding the newborn may not know how to properly support the neck. As a result the baby's head may undesirably bounce around, or otherwise not be in proper alignment with the body. Another shortcoming of swaddles is that they loosen, especially as the baby gets a bit stronger and moves with more force. As a result the swaddle does not provide the desired snugness, and the caretaker must re-swaddle the baby.

Another problem associated with swaddling babies, and using blankets in general, is that they are incompatible with restraining belts used with car seats, strollers and other baby carriers. More specifically, conventional swaddling encloses the legs in a unitary bundle, so a restraining belt can't be secured between the wearer's legs, as is required for 5-point systems and the like. Alternatively, one can secure an uncovered baby into restraining system and simply drape the blanket over the baby, but this blanket can easily fall off.

While the various shortcomings of baby blankets and swaddling systems have been discussed, many blanket and/or clothing issues also exist for elderly, physically challenged and other persons. For example, standard clothing is difficult to put on and take off for many people. Additionally, draping a blanket over a wheelchair bound person is often ineffective because blankets fall off or can be blown off in the wind. Moreover, a person who is wrapped snugly in a blanket can't use restraint belts which pass between the legs.

As can be seen, there is a need for an article that provides the benefits of conventional swaddling, except also provides warmth to the head, supports the neck, permits the use of restraining belts, and/or allows independent leg movement. It is desirable that the same general design can be used with people of all sizes, from newborn to adults, by merely scaling up the size of the article with identical or similar proportions. It is also desirable that one article can accommodate a variety of sizes and functionalities, including swaddling a newborn to a pajamas-like garment for older children.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As used herein, the following structure numbers apply to the following structures among the various views:

10—Article;
12—Front surface;
14—Back surface;
15—Fastener;
16—Lateral projection;
17—Upper end;
18—Lower end;
20—Drawstring;
22—Cord lock;
24—Pocket;
30—Slit;
32—Flap;
34—Leg;
40—Pillow;
42—Aperture;
50—Compartment; and
52—Support member.

Figure 1:
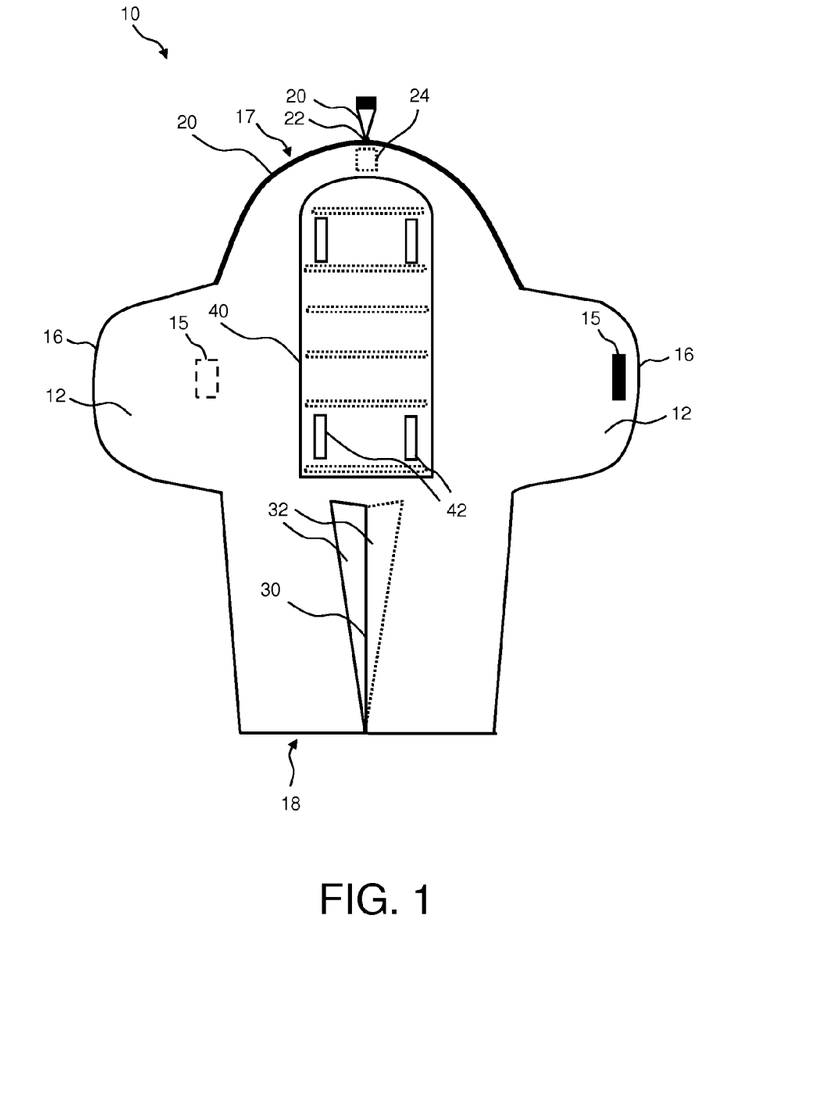
FIG. 1 is a plan view of the of the invention depicting the unwrapped front surface.

Referring to FIG. 1, an embodiment of article 10 generally includes fabric substrate having upper end 17, lower end 18, and lateral projections 16 there between. Article 10 can be constructed of a variety of types of fabrics including flannel; fleece; fabrics constructed of natural fibers, synthetic fibers and combinations; fire resistant fabrics; fire proof fabrics; fire retardant fabrics; and fabrics having various weights, thicknesses, loft and warmth.

Figure 2:
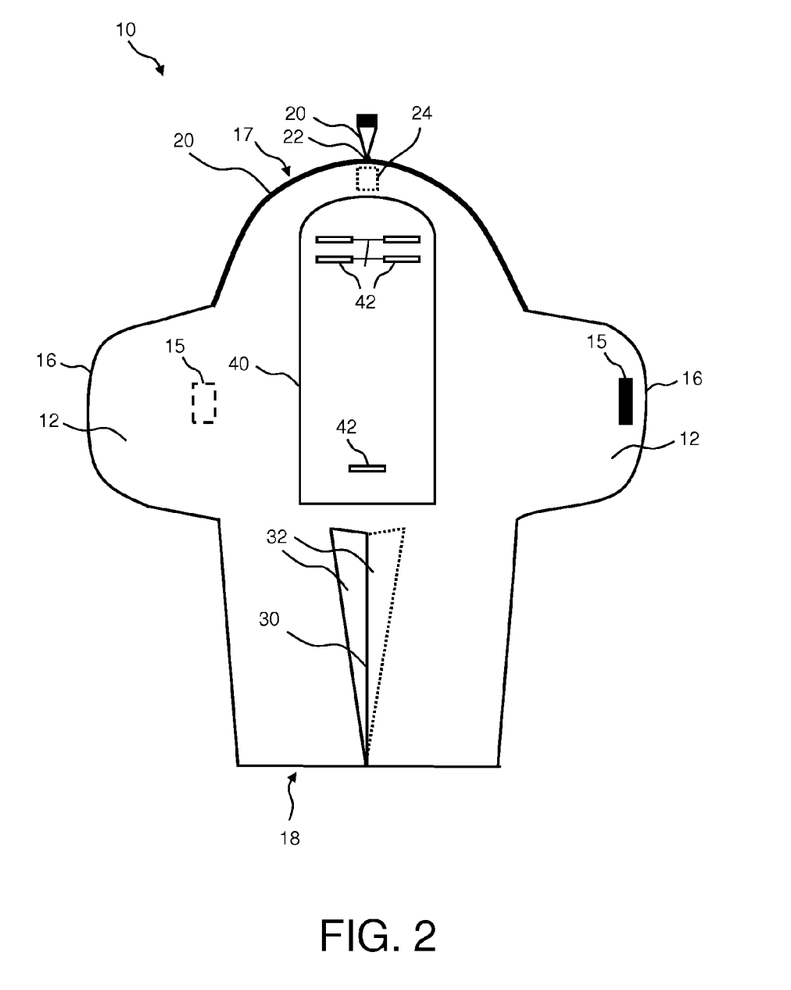
FIG. 2 is another plan view of invention depicting the unwrapped front surface.

Along upper end 17 is drawstring 20 that can be secured in cinched position with cord lock 22 for purposes of forming a hood. Article desirably includes pocket 24 to store excess drawstring 20 and/or cord lock 22 out of wearer's reach. Article 10 desirably also includes pillow 40 which is detachably connected to the fabric substrate, and includes a plurality of apertures 42 for the passage through of restraining belts. As can be seen from FIG. 2, the specific orientation of apertures 42 can vary. A plurality of fasteners 15 are employed to secure various portions of the article, with fasteners desirably being hook and loop, snaps, buttons, ties, or the like.

Extending upwardly from lower end 18 is slit 30. On left and right side of slit 30 is a pair of flaps 32 which are preferably triangular and taper to a point at lower end 18. Flaps 32 are formed of the fabric substrate and provide additional fabric adjacent slit 30 for comfortably forming legs from the article.

Figure 5:
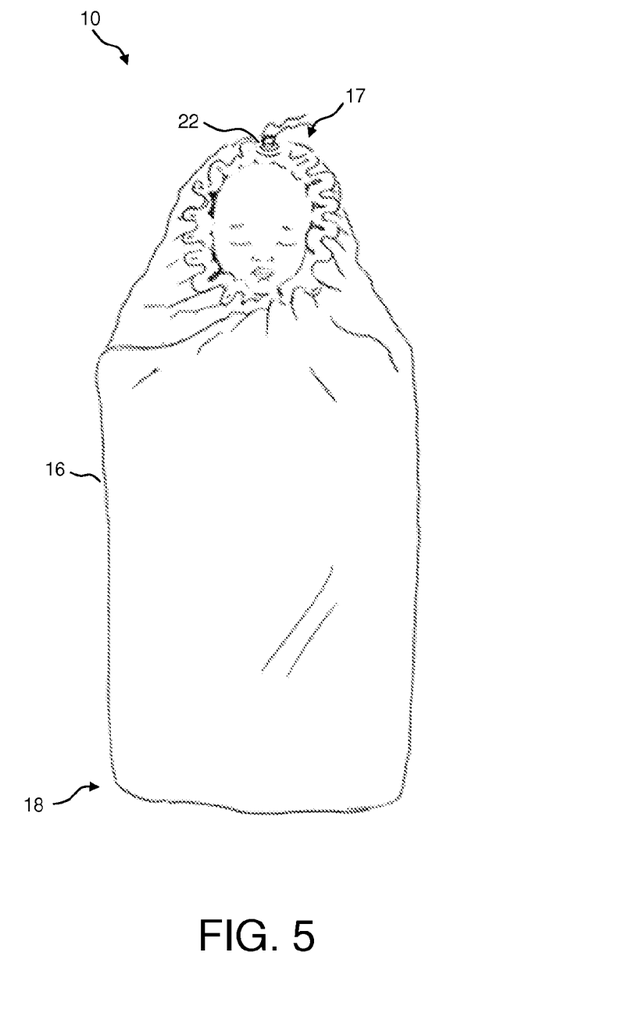
FIG. 5 is an embodiment of the invention shown with a baby fully swaddled.
Figure 7:
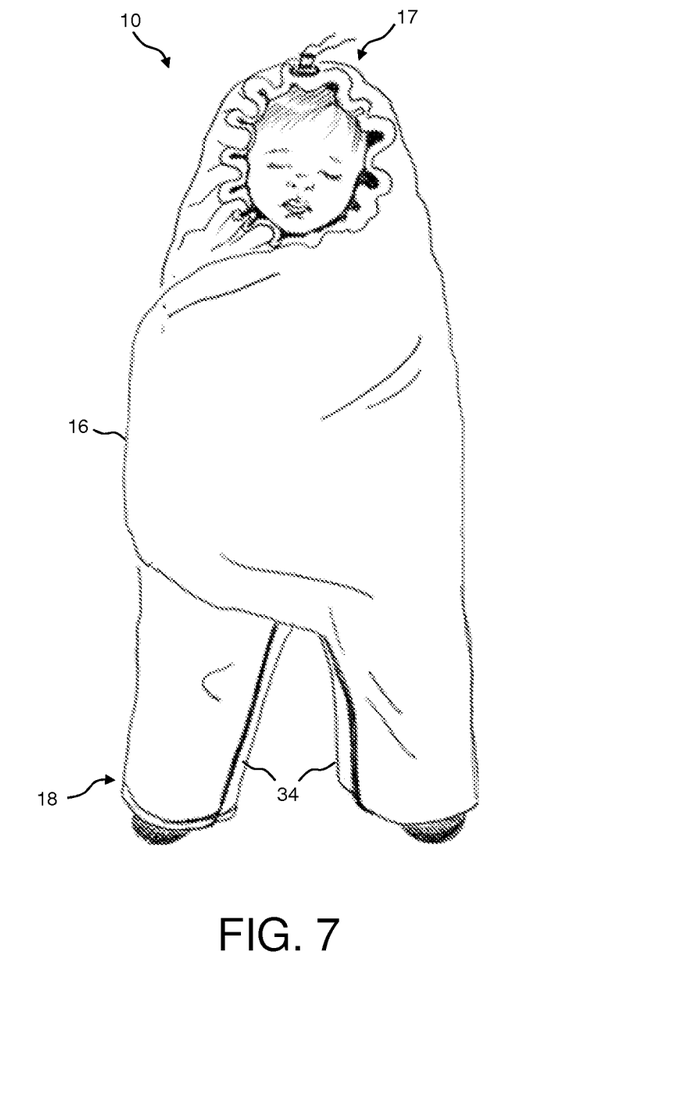
FIG. 7 is an embodiment of the invention in use, depicting article swaddling a baby yet allowing for independent leg movement.

FIG. 5 depicts a small baby wrapped in article 10 with drawstring cinched with cord lock 22 to form a hood. As can be seen, article 10 can be used to "swaddle" the baby, or, as shown in FIG. 7, article 10 can be used to form legs 34. The swaddled and legged versions are achieved by wrapping article 10.

Restraining belts that go between the legs can be used when article 10 is in the legged orientation. It should be understood that apertures 42, shown on pillow 40, also exist on underlying fabric substrate. Accordingly, it is possible to pass restraining belts through pillow and fabric substrate of article 10, restrain the passenger with the belt, then wrap the passenger in the normal manner with article 10. In this manner the restraining belt is wrapped with the passenger, both within article 10.

Figure 6:
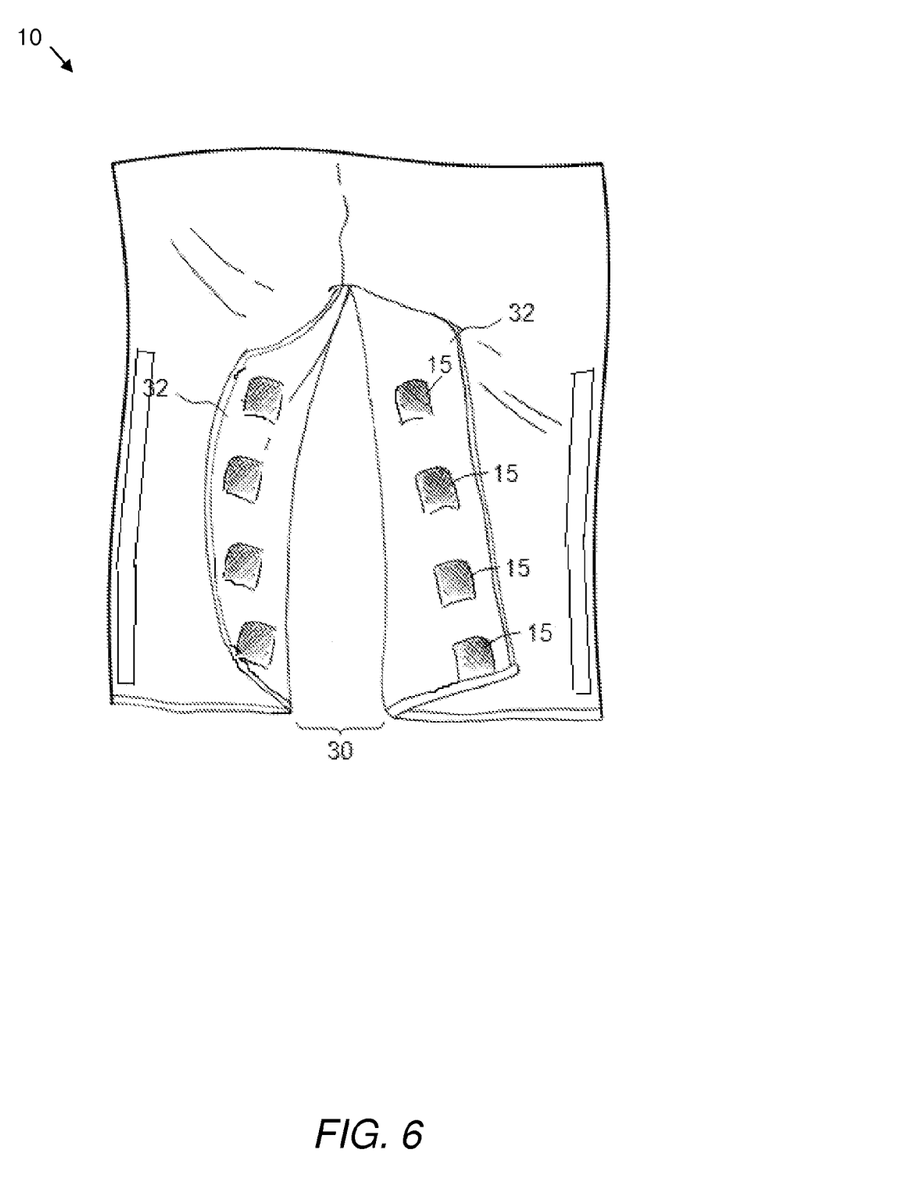
FIG. 6 depicts the fasteners on the lower end of the article for securing the flaps to allow for independent leg movement.

As shown in FIG. 6, legged orientation of article 10 is formed by laying a person on the article, with legs on opposite sides of slit 30, and lateral projections 16 on opposite sides of person. Legs are then each individually wrapped with surrounding material and secured with fasteners 15 (best shown in FIG. 6). The upper portion of the person is wrapped by bringing one lateral projection 16 across the torso, then the other lateral projection 16 across the torso, and attaching the overlapping lateral projections to each other using fasteners 15. The resulting legged orientation is depicted in FIG. 7. It is noted that the person's arms are enclosed within article 10.

FIG. 6 shows the overlapping structure of flaps 32. It is a structural feature of this invention to provide substantial material, versus a simple slit, such that there is adequate fabric substrate to comfortably enclose the wearer's legs, as shown in FIG. 7.

Figure 4:
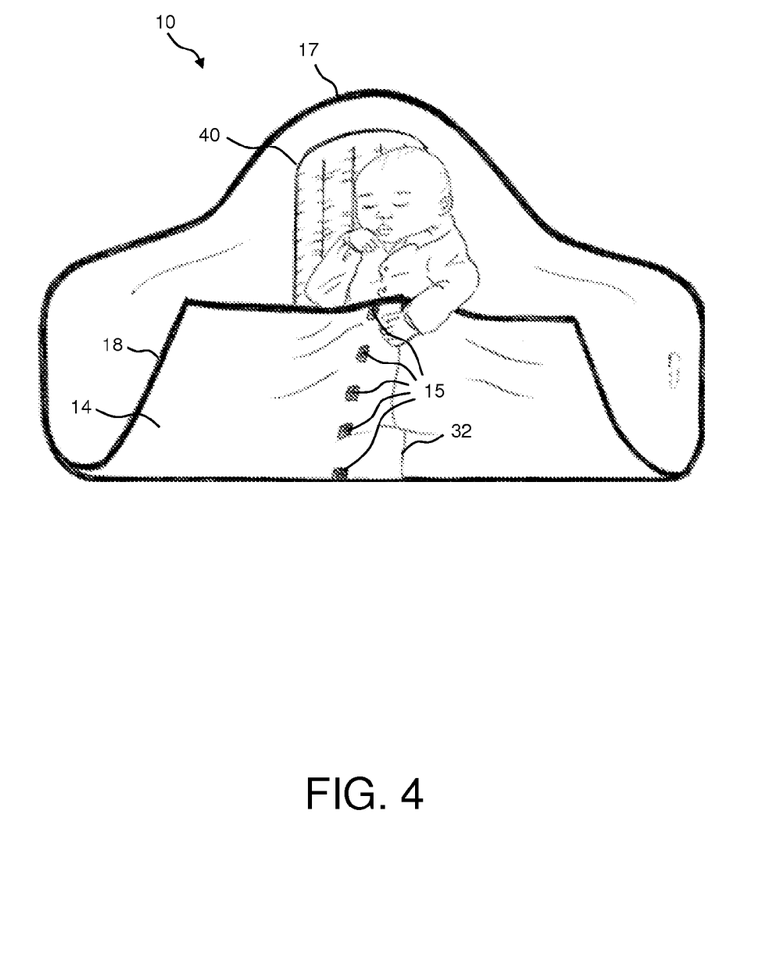
FIG. 4 is an embodiment of the invention in use, depicting the first step in wrapping the article to swaddle a baby.

As shown in FIG. 4, another advantage of having overlapping flaps 32 is that lower end 18 of article can be folded upward and provide continuous coverage, so that the smooth swaddle of FIG. 5 can be achieved.

An alternative embodiment (not shown) preferably includes lateral projections 16, pillow 40, drawstring 20, and cord lock 22, but no slit 30 or flaps 32 for forming legs 34. This is a simple swaddling article.

Figure 3:
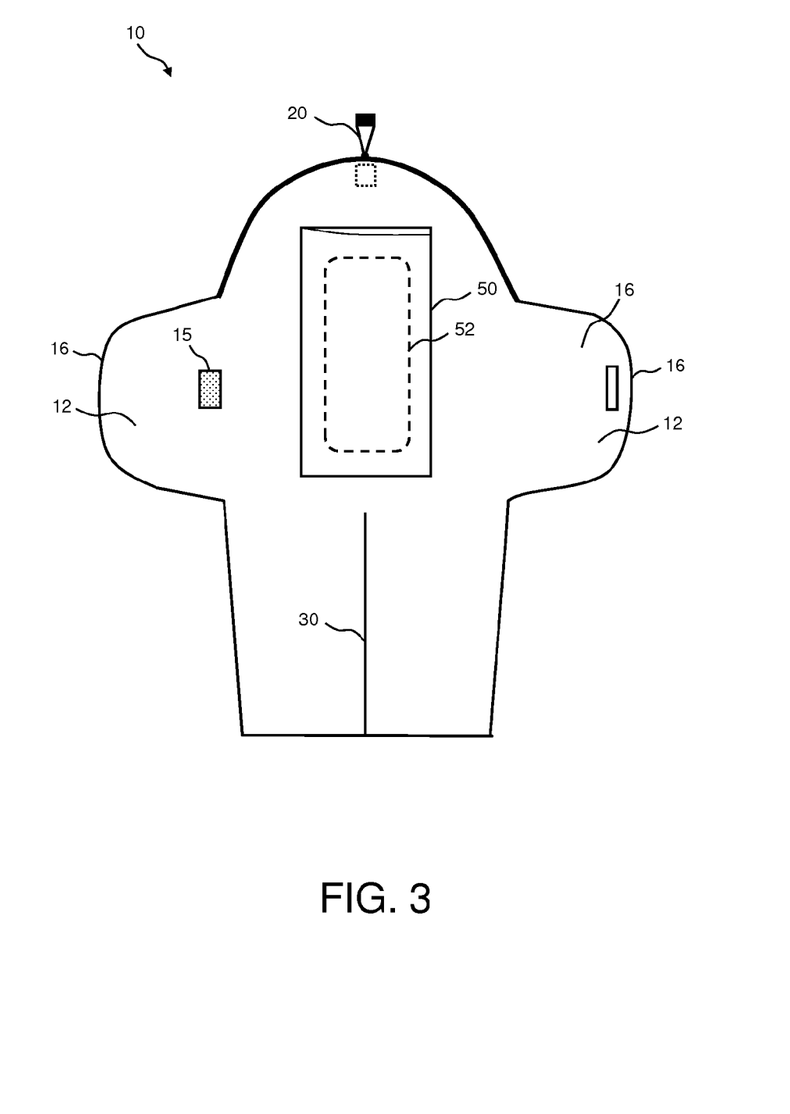
FIG. 3 is a plan view of the back surface of the invention depicting the support member secured in the compartment of the article.

Another embodiment, depicted in FIG. 3, includes compartment 50 on back surface 14 for removably receiving support member 52. It is desirable that support member 52 provides some rigidity to the neck region of the article, yet is flexible enough to be comfortable. This feature helps prevent undesirable backward movement of head.

While the FIGS. and descriptions generally describe article 10 for use with infants and small babies, the present invention is likewise amenable to use by people of any size, with elderly and physically challenged people especially well-suited for the article. Thus, it is within the scope of the invention to provide a variety of sizes and proportions, based on the intended use.

It should be understood, of course, that the foregoing relates to exemplary embodiments of the invention and that modifications may be made without departing from the spirit and scope of the invention as set forth in the following claims.

What is claimed is:

1. An article for providing warmth and comfort to a person including:
   A) A fabric substrate having a front surface, a back surface, an upper end, and a lower end;
   B) First and second lateral projections defined by said fabric substrate, said lateral projections between said upper end and said lower end;
   C) A slit defined by said fabric substrate extending upwardly from said lower end;
   D) Two flaps, each adjacent opposing edges of said slit, wherein one of said flaps overlaps the other of said flaps when article is laid flat;
   E) A plurality of first portions of mating fasteners positioned approximately parallel to said slit on each of said two flaps; and
   F) Corresponding second portions of mating fasteners positioned approximately parallel to lateral edges of said lower end, wherein said first and second portions are engageable to form substantially cylindrical legs.

2. The article of claim 1 wherein said first lateral projection opposes said second lateral projection.

3. The article of claim 2 wherein said first and second lateral projections are substantially similar with respect to size and shape.

4. The article of claim 3 further comprising a mating fastener for engaging said first lateral projection with said second lateral projection.

5. The article of claim 4 wherein said mating fastener includes a first portion positioned on said front surface of said first lateral projection, and a second portion positioned on said back surface of said second lateral projection.

6. An article for providing warmth and comfort to a person wearing a restraining belt including:
   A) a fabric substrate including opposing lateral projections and defining a slit extending upwardly;
   B) two flaps, each adjacent opposing edges of said slit, wherein one of said flaps overlaps the other of said flaps when article is laid flat;
   C) a plurality of first portions of mating fasteners positioned approximately parallel to said slit on each of said two flaps;
   D) corresponding second portions of mating fasteners positioned opposite said first portions, wherein said first and second portions are engageable to form substantially cylindrical legs; and
   E) at least one pair of body apertures defined by said fabric substrate.

7. The article of claim 6 wherein said body apertures are substantially rectangular in shape.

8. The article of claim 7 wherein said body apertures are longitudinally oriented.

9. The article of claim 6 further comprising a pillow, said pillow defining at least one pair of pillow apertures.

10. The article of claim 9 wherein said pair of pillow apertures align with said pair of body apertures thereby allowing a restraining belt to pass through both pairs of apertures.

11. The article of claim 6 wherein said plurality of first portions of mating fasteners are on a front surface of said flaps, and said corresponding second portions of mating fasteners are on a back surface of said fabric substrate.

12. The article of claim 11 wherein said second portions of mating fasteners are strips of hook and loop fasteners.

13. The article of claim 6 wherein said corresponding second portions of mating fasteners are positioned adjact to lateral edges of said lower end.

14. A method of outfitting a person with a restraint belt-compatible article including the steps of:
   A) inserting a restraint belt through apertures defined by an article, said article including a fabric substrate including opposing lateral projections and defining a slit extending upwardly; two flaps, each adjacent opposing edges of said slit, wherein one of said flaps overlaps the other of said flaps when article is laid flat; a plurality of first portions of mating fasteners positioned approximately parallel to said slit on each of said two flaps; and corresponding second portions of mating fasteners positioned opposite said first portions, wherein said first and second portions are engageable to form substantially cylindrical legs;

B) positioning a person on said article;

C) securing the person with said restraining belt such that the restraining belt passes between the person's legs and traverses said slit;

D) wrapping the article around the person's torso to secure arms within said article; and F) forming substantially cylindrical legs around both of the person's legs individually such that legs are independently movable.

15. The method of claim 14 further comprising the step of pulling a drawstring to cinch an upper end of said article around the person's head.

16. The method of claim 15 further comprising the step of inserting a loose end of said drawstring into a pocket.

17. The method of claim 14 further comprising the step of securing the article around the person's torso by engaging mating fasteners.

18. The method of claim 14 further comprising the step of securing the article around the person's legs by engaging mating fasteners.

\* \* \* \* \*